(12) United States Patent
Choi et al.

(10) Patent No.: US 11,000,354 B2
(45) Date of Patent: May 11, 2021

(54) ELECTRIC TOOTHBRUSH

(71) Applicant: NOKSIBCHO ALOE CO., LTD., Incheon (KR)

(72) Inventors: Jae Seung Choi, Jeollanam-do (KR); Joo A Choi, Jeollanam-do (KR)

(73) Assignee: Jae Seung Choi, Gwangju (KR)

( * ) Notice: Subject to any disclaimer, the term of this patent is extended or adjusted under 35 U.S.C. 154(b) by 68 days.

(21) Appl. No.: 16/337,437

(22) PCT Filed: Sep. 29, 2017

(86) PCT No.: PCT/KR2017/010995
§ 371 (c)(1),
(2) Date: Mar. 28, 2019

(87) PCT Pub. No.: WO2018/062951
PCT Pub. Date: Apr. 5, 2018

(65) Prior Publication Data
US 2019/0274801 A1    Sep. 12, 2019

(30) Foreign Application Priority Data
Sep. 30, 2016  (KR) .................... 10-2016-0126020

(51) Int. Cl.
*A61C 17/22* (2006.01)
*A61C 17/34* (2006.01)
*A61C 17/26* (2006.01)

(52) U.S. Cl.
CPC .......... *A61C 17/222* (2013.01); *A61C 17/349* (2013.01); *A61C 17/3418* (2013.01);
(Continued)

(58) Field of Classification Search
CPC ....... A61C 17/222; A61C 17/24; A61C 17/26; A61C 17/3418; A61C 17/3445; A61C 17/3472; A61C 17/349
(Continued)

(56) References Cited

U.S. PATENT DOCUMENTS 2,739,327 A * 3/1956 Blair .................... A61C 17/349
15/23
4,603,448 A * 8/1986 Middleton ......... A61C 17/3418
15/22.1
5,809,601 A    9/1998 Rivera

FOREIGN PATENT DOCUMENTS

DE    3306969    *  5/1984
DE    10110505   *  9/2002
(Continued)

OTHER PUBLICATIONS

International Search Report dated Feb. 19, 2018 in International Application No. PCT/KR2017/010995.
(Continued)

*Primary Examiner* — Mark Spisich
(74) *Attorney, Agent, or Firm* — Eric L. Lane; Green Patent Law

(57) ABSTRACT

An electric toothbrush of the present invention includes: a case having first and second drive shafts exposed therefrom, the first and second drive shafts being rotated in opposite directions and moved forward and backward respectively by a drive unit which is driven by a motor; first and second toothbrush bodies coupled to the first and second drive shafts by first and second coupling units respectively, so as to transmit the rotational force and forward and backward motions of the first and second drive shafts; a brush installed at the ends of the first and second toothbrush bodies so as to clean teeth by the rotational force and forward and backward motions transmitted to the first and second toothbrush bod-
(Continued)

ies; and a third toothbrush body having an auxiliary brush, which is coupled to a third drive shaft of the drive unit installed in the case.

8 Claims, 11 Drawing Sheets

(52) U.S. Cl.
 CPC ...... *A61C 17/3445* (2013.01); *A61C 17/3472* (2013.01); *A61C 17/26* (2013.01)
(58) Field of Classification Search
 USPC .......................................................... 15/23
 See application file for complete search history.

(56) References Cited

FOREIGN PATENT DOCUMENTS

| EP | 1013238 | * | 6/2000 |
|----|---------|---|--------|
| JP | 11-235234 A | | 8/1999 |
| KR | 10-2005-0011792 A | | 1/2005 |
| KR | 10-2005-0051885 A | | 6/2005 |
| KR | 10-2006-0050013 A | | 5/2006 |

OTHER PUBLICATIONS

Written Opinion in International Application No. PCT/KR2017/010995.

\* cited by examiner

[FIG. 1]
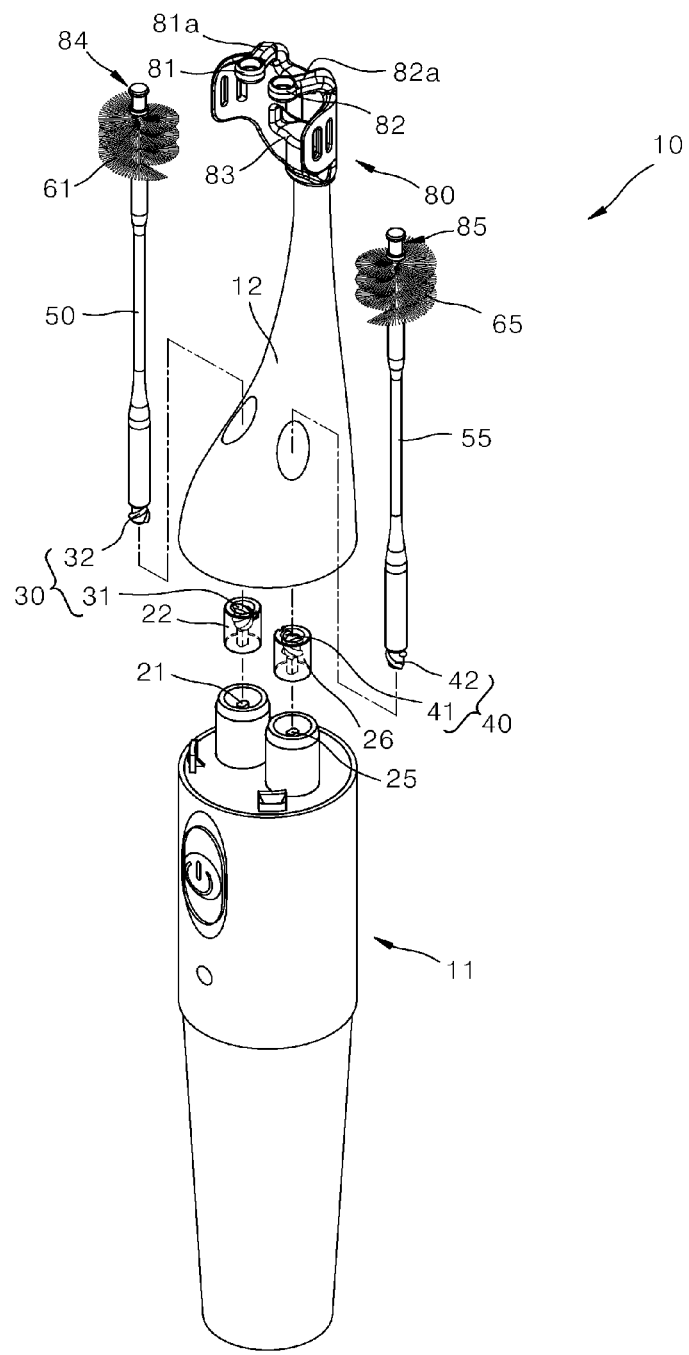

[FIG. 2]
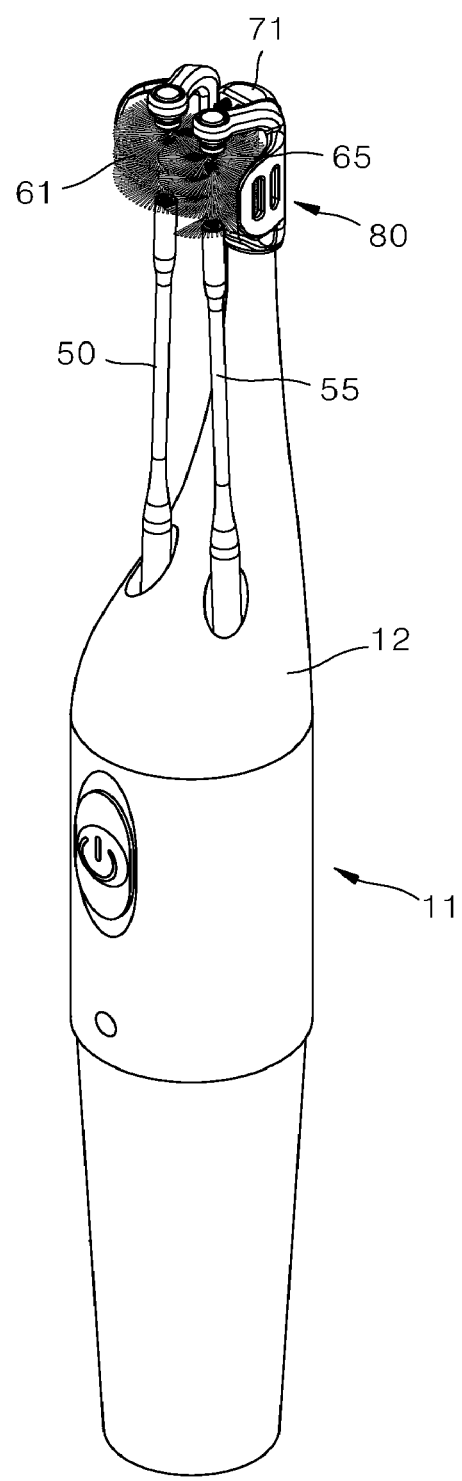

[FIG. 3]
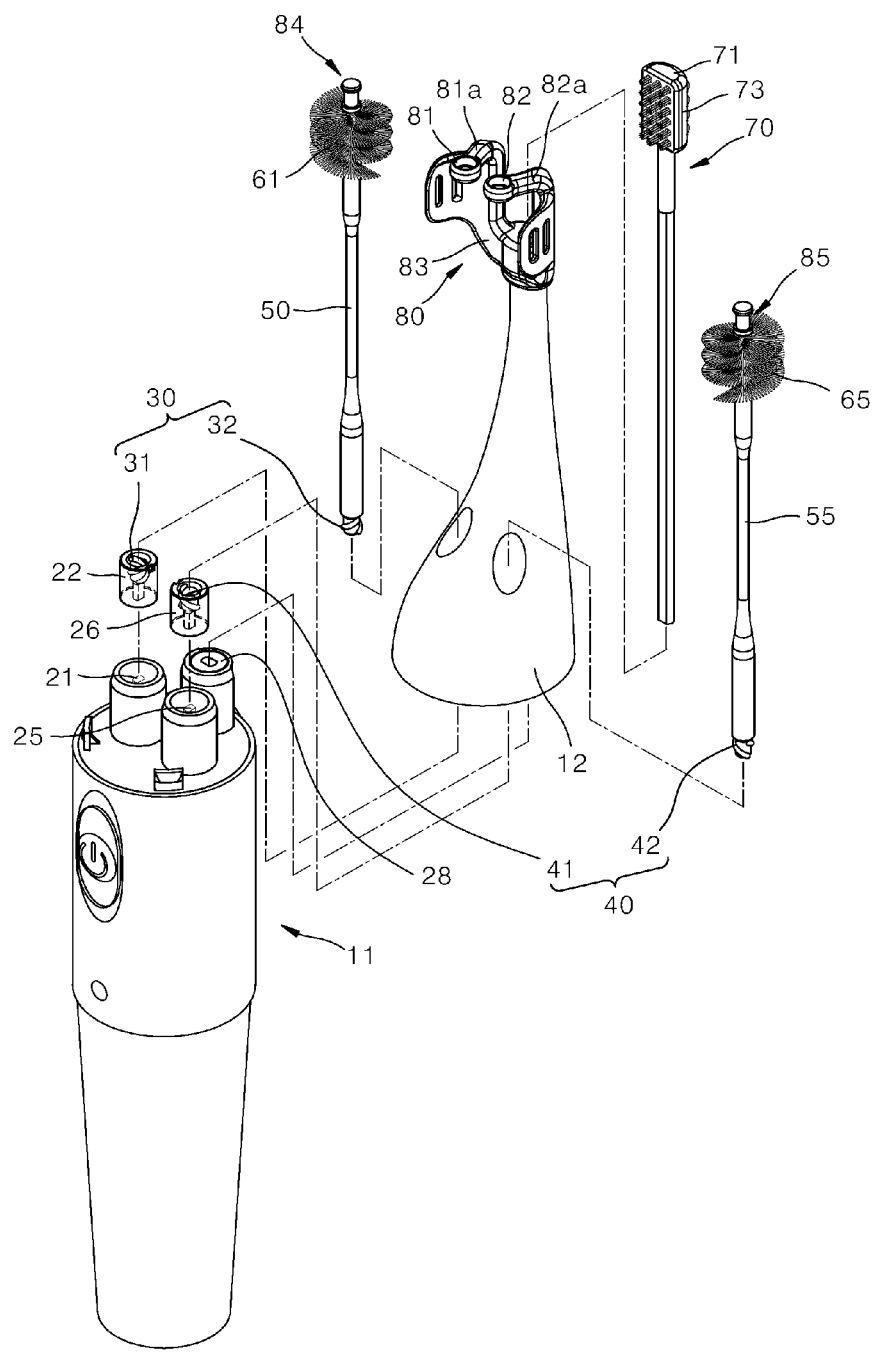

[FIG. 4]
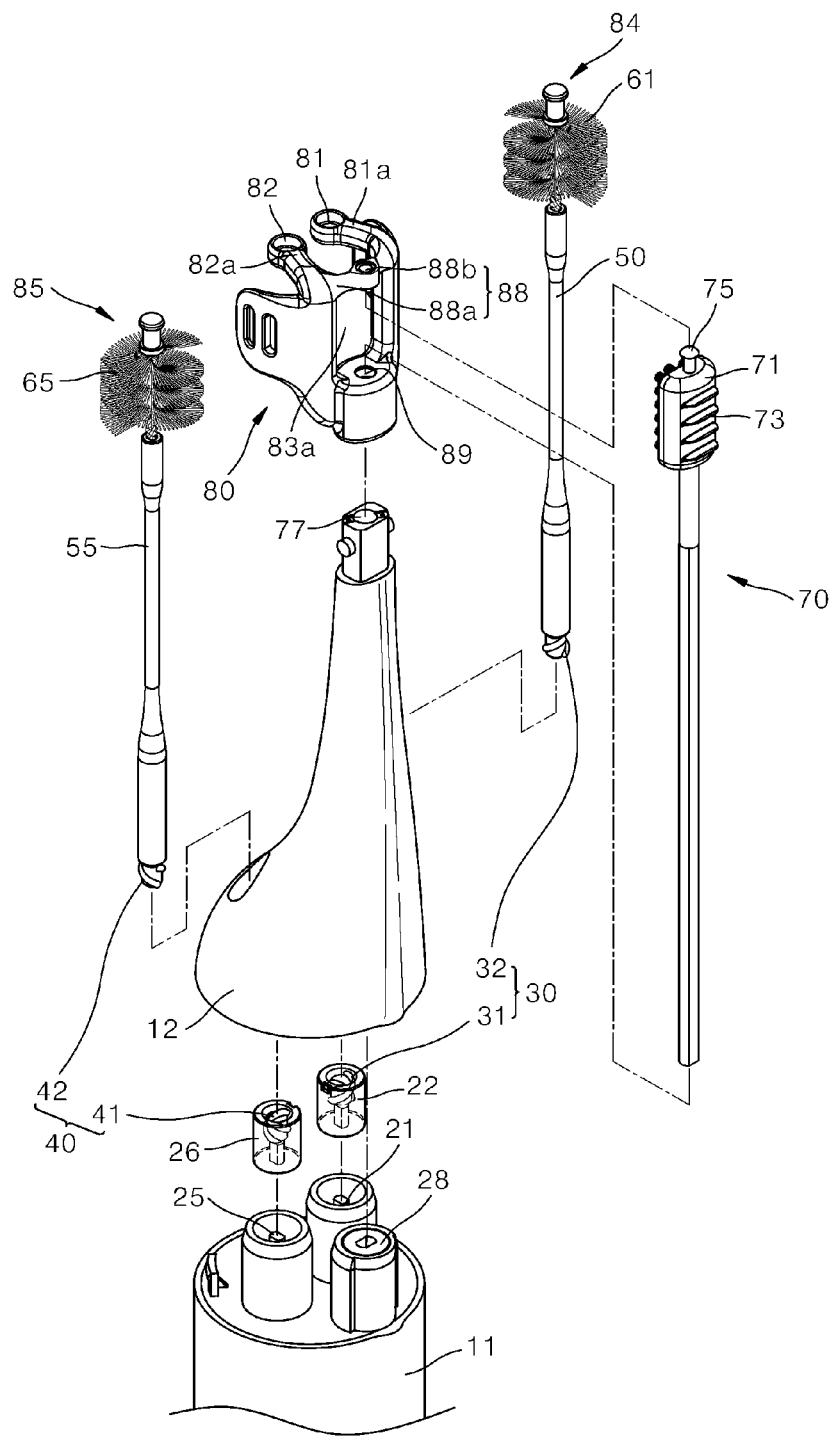

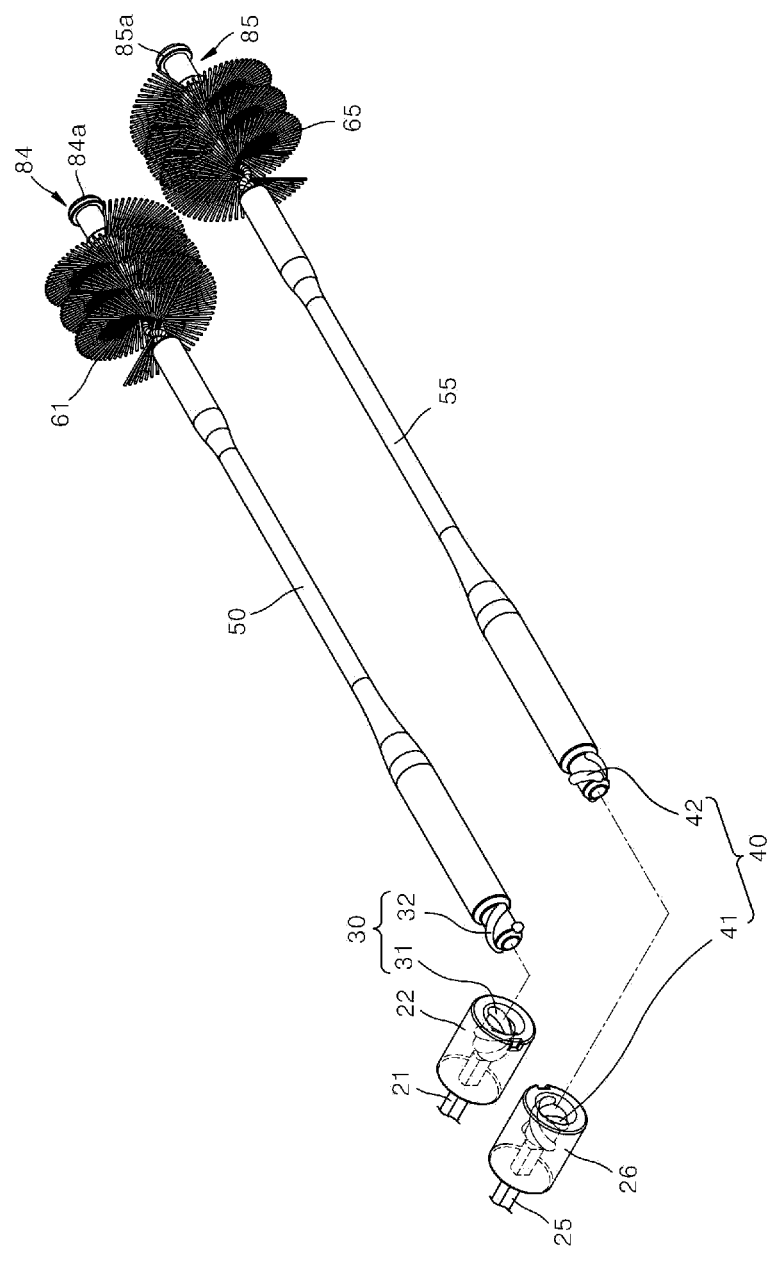
[ FIG. 5 ]

【 FIG. 6 】
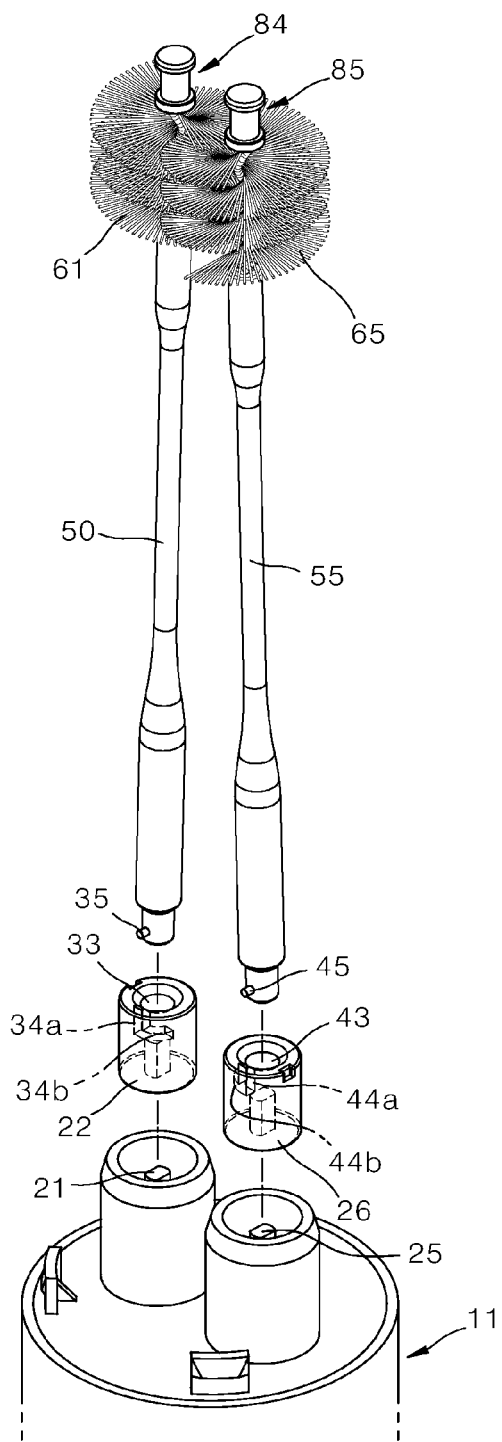

【FIG. 7】
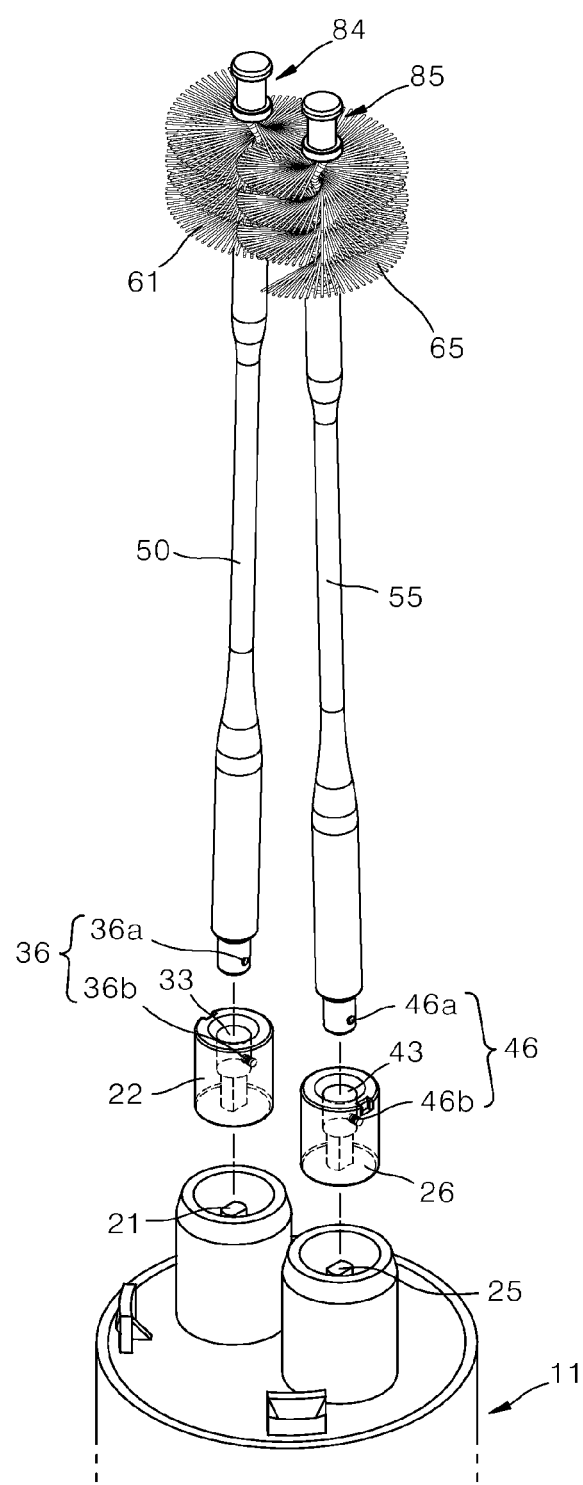

[ FIG. 8 ]
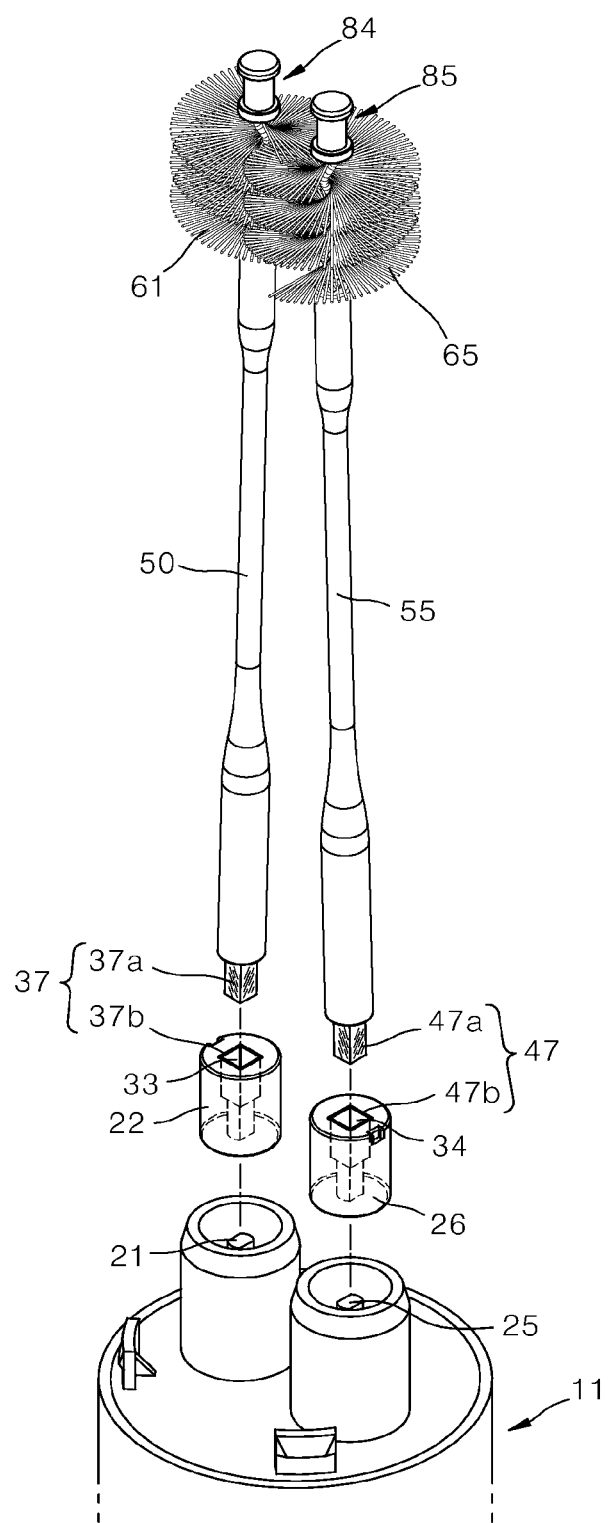

【FIG. 9】
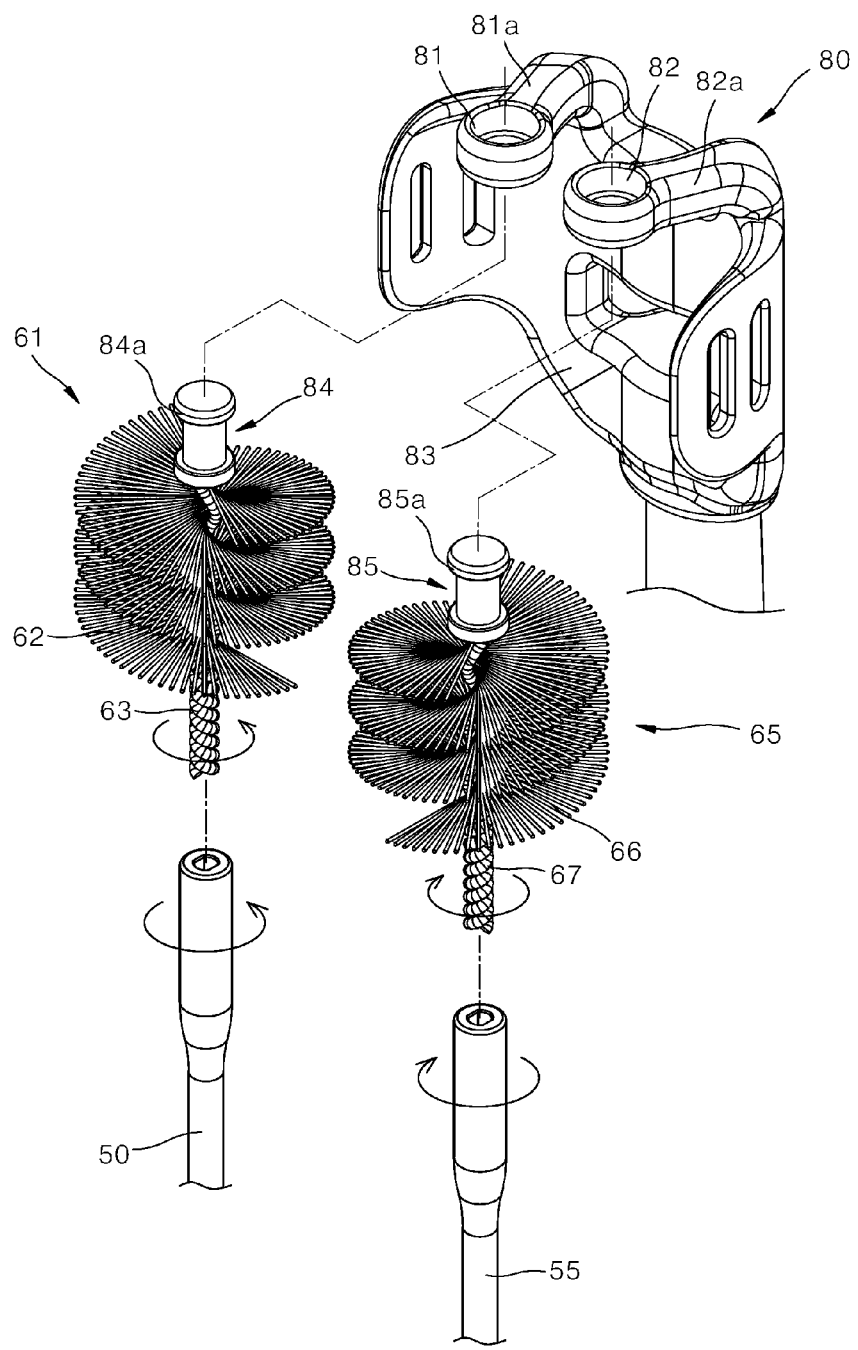

[ FIG. 10 ]
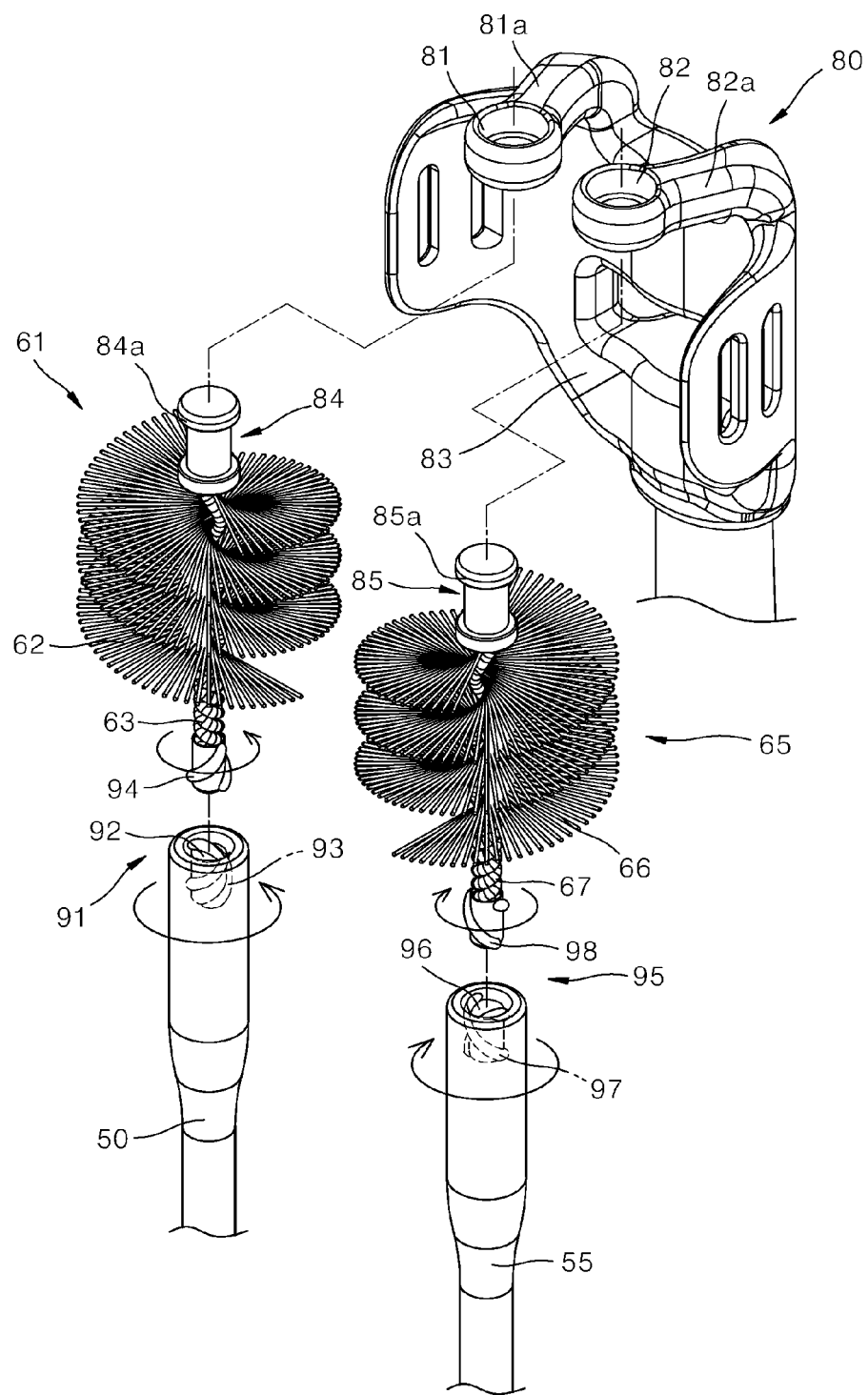

【 FIG. 11 】
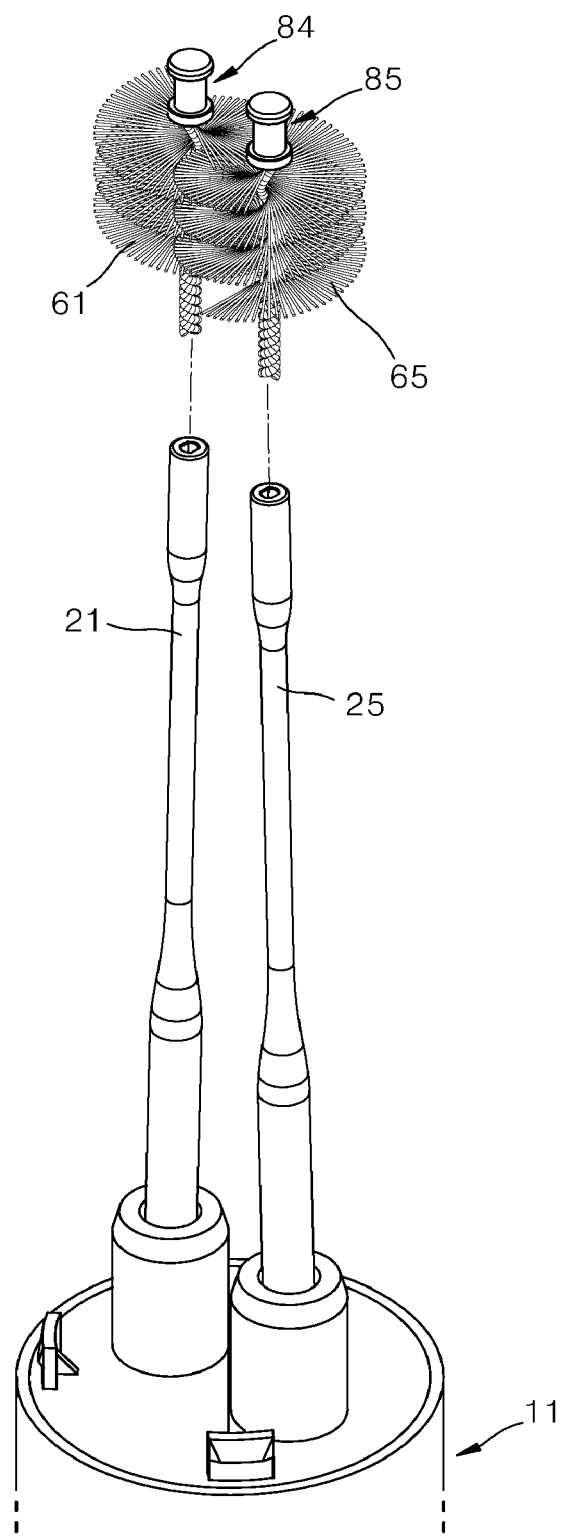

ELECTRIC TOOTHBRUSH

TECHNICAL FIELD

The present invention relates to an electric toothbrush, and more specifically, to an electric toothbrush with an improved coupling structure of a drive shaft and a toothbrush body or a drive shaft and a brush.

BACKGROUND ART

Generally, a toothbrush is a teeth cleaning tool used to remove a foreign material attached to teeth or protect teeth from harmful bacteria, and a manual toothbrush and an electric toothbrush which clean teeth by moving a brush part in a predetermined direction are used.

A method for using a toothbrush includes a scraping method in which a toothbrush is reciprocated on the teeth, a bass method in which bristles vibrate forward and backward between the teeth at an inclination of about 45°, and a method of vertically and circularly moving the toothbrush on the teeth and gums.

The bass method of the above-described methods of using a toothbrush has an advantage of less damage to the gums and a relatively good cleaning force, but it is not easy to use the toothbrush in the above-described manner due to a musculoskeletal structure of a hand and an arm and is also difficult for a user who is familiar with an inappropriate brushing habit to learn an appropriate brushing method.

Given this, an electric toothbrush has been developed and used in consideration of efficiency of teeth cleaning and limitation of the acquisition of brushing patterns by a hand and arm of a user.

An electric toothbrush is disclosed in Korean Patent Registration No. 10-0745842 (Jul. 27, 2007). The disclosed electric toothbrush includes a case equipped with a motor, first and second toothbrush bodies which are rotatably installed in the case, have an elastic force, and include brushes provided at end parts thereof, a power transfer part installed in the case and installed between the motor and the first and second toothbrush bodies to rotate each of the first and second toothbrush bodies, and a vibration generating part for vibrating the first and second toothbrush bodies.

A bidirectional electric toothbrush is disclosed in Korean Patent Registration No. 10-0529409 (Nov. 10, 2005), and an electric toothbrush using two brushes is disclosed in International Patent Application No. PCT/KR02/01334.

The conventional electric toothbrush configured as described above can simultaneously clean inner surfaces and outer surfaces of teeth, but it is difficult to change a brush for cleaning teeth. Particularly, in the case of the electric toothbrush, the replacement period is relatively short due to severe wear of the brush. Further, when the brush or the toothbrush body supporting the brush is changed, there is a problem in that it is difficult to couple or separate the brush to or from the toothbrush body.

DISCLOSURE

Technical Problem

The present invention is directed to providing an electric toothbrush which allows a drive shaft to be easily coupled to or separated from a toothbrush body, in which a brush for cleaning is installed, or allows a toothbrush body to be easily coupled to or separated from the brush and may increase cleaning efficiency of teeth by increasing the transfer performance of a driving force by which the drive shaft is rotated and moved forward and backward.

The present invention is directed to providing an electric toothbrush capable of fundamentally preventing degradation of a horizontal contact force between a brush and teeth by an elastic force of a cover member covering a toothbrush body and the brush when front and rear surfaces of teeth or the front and rear surfaces and occlusal surfaces of the teeth are cleaned, and capable of increasing cleaning efficiency of the teeth.

The present invention is directed to providing an electric toothbrush capable of increasing the covering performance of a cover member partially surrounding brushes by minimizing interference with forward and backward movement of the toothbrush body.

Technical Solution

One aspect of the present invention provides an electric toothbrush which includes a case configured at which a drive shaft rotated and moved forward or backward by a drive unit driven by a motor is exposed, a toothbrush body coupled with the drive shaft by a coupling unit to transfer forward and backward motions and a rotating force to the drive shaft, and a brush installed on an end portion of the toothbrush body and configured to clean teeth by the rotating forces and the forward and backward motions transferred to the toothbrush body.

The coupling unit for coupling the drive shaft installed in the case with the toothbrush body may include a spiral inclined groove formed in the drive shaft, and the toothbrush body may include a spiral protrusion coupled with the spiral inclined groove by a rotating force of the drive shaft.

The toothbrush body may be coupled with and separated from the brush by the brush coupling unit, the brush may include a brush frame configured to support the bristles twisted in a direction in which the bristles are twisted in a direction opposite to a rotation direction of the drive shaft, and the brush coupling unit may allow the brush frames to be forcibly inserted into or screw-coupled with the toothbrush body in a direction in which the brush frame is twisted by a rotating force of the toothbrush body.

Another aspect of the present invention provides an electric toothbrush which includes a case configured at which first and second drive shafts, which are rotated in opposite directions and moved forward and backward by a drive unit driven by a motor, are exposed, first and second toothbrush bodies coupled with the first and second drive shafts by first and second coupling units to transfer forward and backward motions and rotating forces to the first and second drive shafts, and first and second brushes installed on end portions of the first and second toothbrush bodies to clean teeth by the forward and backward motions and the rotating forces transferred to the first and second toothbrush bodies.

The first and second toothbrush bodies coupled with the first and second drive shafts may be installed to be inclined so that a gap between the first and second toothbrush bodies gradually decreases from the first and second drive shafts toward the first and second brushes.

The first coupling unit configured to couple the first drive shaft installed in the case with the first toothbrush body includes a first spiral inclined groove formed in the first drive shaft, and the first toothbrush body includes a first spiral protrusion coupled with the first spiral inclined groove by the rotating force of the first drive shaft, and the second coupling unit configured to couple the second drive shaft installed in the case with the second toothbrush body includes a second spiral inclined groove formed in the second drive shaft, and the second toothbrush body includes a second spiral protrusion coupled with the second spiral inclined groove by the rotating force of the second drive shaft.

Still another aspect of the present invention provides an electric toothbrush which includes a case at which first and second drive shafts, which are rotated in opposite directions and moved forward and backward by a drive unit driven by a motor, are exposed, first and second toothbrush bodies coupled with the first and second drive shafts by first and second coupling units and configured to transfer forward and backward motions and rotating forces to the first and second drive shafts, first and second brushes coupled with end portions of the first and second toothbrush bodies and configured to clean teeth by the rotating forces and the forward and backward motions transferred to the first and second toothbrush bodies, and a third toothbrush body including an auxiliary brush coupled with a third drive shaft of the drive unit installed in the case to be rotated at a predetermined angle so as to brush an occlusal surface of the teeth.

Advantageous Effects

In the electric toothbrush according to the present invention, since a brush can be coupled to or separated from a toothbrush body by a driving force of a drive shaft when the brush is worn out, the brush can be easily replaced, and due to a structure in which the toothbrush body is inclined forward, a contact force between the brush and teeth can be increased by an elastic force of a cover member covering the toothbrush body and the brush. Further, when both sides of the teeth are cleaned by two brushes, the brushes come in contact with the teeth in parallel so as to evenly perform cleaning, and furthermore, the commercial value of the electric toothbrush can be increased.

DESCRIPTION OF DRAWINGS

FIG. 1 is an exploded perspective view of an electric toothbrush according to the present invention.

FIG. 2 is a perspective view showing an electric toothbrush according to another embodiment of the present invention.

FIG. 3 is an exploded perspective view showing an electric toothbrush according to still another embodiment of the present invention.

FIG. 4 is an exploded perspective view showing the electric toothbrush according to another embodiment of the present invention.

FIG. 5 is an exploded perspective view showing first and second coupling units of the electric toothbrush according to the present invention.

FIGS. 6 to 8 are exploded perspective views showing first and second coupling units according to other embodiments of the present invention.

FIG. 9 is an exploded perspective view showing a cover member and a coupling state of a toothbrush body and a brush according to the present invention.

FIG. 10 is an exploded perspective view showing a state in which first and second toothbrush bodies are coupled with first and second brushes according to the present invention.

FIG. 11 is a perspective view showing the electric toothbrush according to another embodiment of the present invention.

MODES OF THE INVENTION

An electric toothbrush according to the present invention is for simultaneously cleaning inner surfaces and outer surfaces of teeth or cleaning inner and outer surfaces and occlusal surfaces of the teeth by rotating and moving a brush forward and backward, and embodiments are shown in FIGS. 1 to 8.

As shown in FIG. 1, an electric toothbrush 10 according to the present invention includes a case 11 at which first and second drive shafts 21 and 25 rotated and moved forward and backward by a driving unit driven by a motor are exposed, first and second toothbrush bodies 50 and 55 coupled with the first and second drive shafts 21 and 25 by first and second coupling units 30 and 40 to transfer forward and rearward motions and rotating forces to the first and second drive shafts 21 and 25, and first and second brushes 61 and 65 installed on end parts of the first and second toothbrush bodies 50 and 55 to clean teeth by the rotating force and the forward and backward motions transferred to the toothbrush bodies.

As shown in FIGS. 2 and 3, the electric toothbrush 10 may further include a third toothbrush body 70 installed in the case 11 to be moved forward and backward by the drive unit or to be rotatable at a predetermined angle to brush an occlusal surface of the teeth. The auxiliary brush 71 installed in the third toothbrush body 70 is positioned between the pair of first and second brushes 61 and 65.

As shown in FIG. 3, a tongue cleaner part with a plurality of protrusions 73 may be further provided on a rear side of the auxiliary brush 71 supported on the third toothbrush body 70.

The electric toothbrush configured as described above will be described in more detail by component as follows.

A motor and a drive unit driven by the motor to rotate and move the first and second drive shafts 21 and 25 forward and backward is installed in the case 11, and the drive unit is disclosed in Korean Patent Registration No. 10-0745842. A power supply of the motor for driving the drive unit may be achieved by a chargeable battery. In this case, the battery is installed in the case.

As shown in FIGS. 1 to 4, a cover supporting part 12 is installed on an upper side of the case 11 so that a diameter thereof is relatively decreased to surround the third toothbrush body, and a cover member 80 for surrounding the first and second brushes 61 and 65 is coupled to an end portion of the cover supporting part 12. The cover member 80 is made of a flexible elastic material. The cover member 80 includes a cover main body part 83, and the cover main body part 83 includes first and second shaft receiving parts 81 and 82 rotatably supporting the first and second brushes 61 and 65 installed on upper portions of the first and second toothbrush bodies 50 and 55, that is, the first and second journal parts 84 and 85 (end portions of the first and second brush frames 63 and 67 described below (see FIG. 9)). The first and second shaft receiving parts 81 and 82 may be supported by first and second supporting parts 81a and 82a extending from the cover main body part 83. The cover member 80 is spaced a predetermined distance from the first and second supporting parts 81a and 82a and, although not shown in the drawings, may further include third and fourth shaft receiving parts, which support upper portions of the first and second toothbrush bodies 50 and 55 or lower portions of the first and second toothbrushes 61 and 65 coupled with upper portions of the first and second toothbrush bodies 50 and 55, and third and fourth supporting parts for supporting the third and fourth receiving parts.

As shown in FIG. 4, an auxiliary brush supporting part 88 for supporting an upper portion of the third toothbrush body 70 is further provided between the first and second supporting parts 81a and 82a. The auxiliary brush supporting part 88 includes a connection part 88a for connecting the first and second supporting parts 81a and 82a, and the connection part 88a includes an auxiliary shaft receiving part 88b rotatably supporting an auxiliary brush journal part 75 formed on an end portion of the auxiliary brush 71. The auxiliary brush 71 is positioned in an opening part 83a formed in a rear surface of the cover main body part 83. Since the connection part 88a of the cover member 80 is supported by the auxiliary brush journal part 75, the cover member 80 is prevented from being deformed rearward when the teeth are cleaned, and thus the first and second brushes 61 and 65 can be prevented from coming out.

The first and second toothbrush bodies 50 and 55 are coupled with the first and second drive shafts 21 and 25 by the first and second coupling units 30 and 40 to transfer rotating forces and forward and rearward forces to the first and second brushes 61 and 65 installed on end portions thereof and may be made of an elastic synthetic resin, a metal, or a nonferrous metal. The first and second drive shafts 21 and 25 may be further provided with first and second coupling members 22 and 26 coupled with the first and second toothbrush bodies 50 and 55. The first and second drive shafts 21 and 25 may be integrated with the coupling members 22 and 26. In the following embodiments, the coupling members may be integrated with end portions of the first and second drive shafts 21 and 25.

An uneven portion, not shown in the drawings, is formed by a knurling process and formed on one side of outer circumferential surfaces of the first and second toothbrush bodies 50 and 55 so as to allow a user to easily grip the first and second toothbrush bodies 50 and 55 when the first and second toothbrush bodies 50 and 55 are replaced.

The first and second toothbrush bodies 50 and 55 have a tapered structure in which a gap therebetween decreases from lower sides thereof toward end portions thereof, but are not limited thereto, and one sides of the first and second toothbrush bodies 50 and 55 may be installed to be inclined so that front sides of the first and second toothbrush bodies 50 and 55 are tapered. In the tapered structure, when the teeth to be cleaned are inserted between the first and second brushes 61 and 65 installed on end portions of the first and second toothbrush bodies 50 and 55, the gap between the first and second toothbrush bodies 50 and 55 is increased such that the first and second toothbrush bodies 50 and 55 are in parallel. Therefore, the first and second brushes 61 and 65 installed on the end portions of the first and second toothbrush bodies 50 and 55 are in parallel, and the first and second brushes 61 and 65 provide a uniform cleaning force to the teeth.

The third toothbrush body 70 is coupled to a third drive shaft 28 installed in the case 11 through insertion supporting holes 89 and 77 formed in the cover member 80 and the cover supporting part 12.

As shown in FIGS. 1, 4, and 5, the first coupling unit 30 for coupling the first drive shaft 21 with the first toothbrush body 50 couples the first drive shaft 21 with a coupling member 22 installed on the case 11 with the first toothbrush body 50 to be rotatable and movable forward and backward, and a first spiral inclined groove 31 is formed in the first drive shaft 21, and a first spiral protrusion 32 screw-coupled with the first spiral inclined groove 31 by the rotating force of the first drive shaft 21 is formed on a lower portion of the first toothbrush body 50. The first spiral inclined groove 31 and the first spiral protrusion 32 may have a relatively large spiral pitch and may have a double spiral structure.

The second coupling unit 40 has substantially the same structure as that of the first coupling unit 30 but has a structure formed in a direction opposite to the spiral direction. That is, the second coupling unit 40 couples the second drive shaft 25 installed in the case 11 with the second toothbrush body 55. A second spiral inclined groove 41 is formed on the second drive shaft 25, and a second spiral protrusion 42 coupled with the second spiral inclined groove 41 by the rotating force of the second drive shaft 25 is formed on an end portion of the second toothbrush body 55. It is not necessary that the first spiral protrusion 32 and the second spiral protrusion 42 are formed in a spiral shape. The first spiral protrusion 32 and the second spiral protrusion 42 may be protrusions to be coupled and moved along the first and second spiral inclined grooves 31 and 41. The first and second spiral inclined grooves 31 and 41 are provided in end portions of the first and second toothbrush bodies 50 and 55, and the first and second spiral protrusions 32 and 42 may be formed on the first and second drive shafts 21 and 25. Further, the inclination angles of the first and second spiral inclined grooves 31 and 41 of the first and second spiral protrusions 32 and 42 may be as close to vertical as possible.

While the first and second spiral protrusions 32 and 42 are in contact with the first and second spiral inclined grooves 31 and 41 of the first and second drive shafts 21 and 25, the first and second drive shafts 21 and 25 are driven to couple the first and second toothbrush bodies 50 and 55 in which the brushes 61 and 65 are installed with the first and second drive shafts 21 and 25 by the first and second coupling units configured as described above. The first and second spiral inclined grooves 31 and 41 are coupled with the first and second spiral protrusions 32 and 42 of the first and second toothbrush bodies 50 and 55 by the rotating force of the first and second drive shafts 21 and 25. Therefore, the first and second toothbrush bodies 50 and 55 do not need to separately rotate about the first and second drive shafts 21 and 25 to couple the first and second toothbrush bodies 50 and 55. Particularly, even when the first and second drive shafts 21 and 25 are coupled with the first and second toothbrush bodies 50 and 55 by the first and second coupling units according to the present invention, the first and second drive shafts 21 and 25 and the first and second toothbrush bodies 50 and 55 may be forcibly separated.

FIGS. 6 to 8 show first and second coupling units according to other embodiments of the present invention. In the embodiments, like reference numerals refer to like elements.

Referring to FIGS. 3 and 6, the first coupling unit 30 according to the present invention includes a first toothbrush body coupling groove 33 formed in an end portion of the first coupling member 22 integrated with the first drive shaft 21, that is an end portion of the first drive shaft 21, in a longitudinal direction. A first vertical guide part 34a is formed on an inner circumferential surface of the first toothbrush body coupling groove 33 in a longitudinal direction, and a first horizontal guide part 34b is formed in a predetermined length from an end portion of the first vertical guide part 34a in a circumferential direction. A first guide pin 35 moving along the first vertical and horizontal guide parts 34a and 34b is installed on a coupling part coupled with the first toothbrush body coupling groove 33, that is, an end portion of the first toothbrush body 50. An insertion groove (not shown) in which the first guide pin 35 is caught is formed in an end portion of the first horizontal guide part 34b. The second coupling unit 40 has substantially the same configuration as that of the above-described embodiment.

That is, the second coupling unit 40 includes a second toothbrush body coupling groove 43 formed on the second coupling member 26, integrated with the second drive shaft 25, in a longitudinal direction. A second vertical guide part 44a is formed on an inner circumferential surface of the second toothbrush body coupling groove 43 in a longitudinal direction, and a second horizontal guide part 44b is formed in a predetermined length from an end portion of the second vertical guide part 44a in a circumferential direction. In this case, the direction of the second horizontal guide part 44b is substantially opposite to that of the first horizontal guide part 34b of the first coupling unit 30. A second guide pin 45 moving along the second vertical and horizontal guide parts 44a and 44b is installed in the coupling part of the end portion of the second toothbrush body 55.

When the first and second guide pins 35 and 45 formed on end portions of the first and second toothbrush bodies 50 and 55 are coupled along the first and second vertical and horizontal guide parts 34a, 34b, 44a, and 44b formed on first and second toothbrush body coupling grooves 33 and 43, the first and second drive shafts 21 and 25 and the first and second toothbrush bodies 50 and 55 are coupled by the first and second coupling units 30 and 40 configured as described above. Since the first and second guide pins 35 and 45 are positioned in the first and second horizontal guide parts 34b and 44b, the rotating forces and the forward and backward motions of the first and second drive shafts 21 and 25 may be transferred to the first and second toothbrush bodies 50 and 55.

FIG. 7 shows first and second coupling units according to another embodiment of the present invention.

Referring to the drawing, the first and second coupling units 36 and 46 are formed with the fixing grooves 36a and 46a formed on lower portions of the first and second toothbrush bodies 50 and 55, and ball plungers 36b and 46b coupled with the fixing grooves 36a and 46a are installed in the first and second toothbrush body coupling grooves 33 and 34 formed in a longitudinal direction of the first and second drive shafts 21 and 25. In this embodiment, the ball plungers 36b and 46b may be formed in an oval shape or a polygonal shape to reduce the slippage caused when the first and second toothbrush body coupling grooves 33 and 34 rotate.

As described above, when the first and second toothbrush bodies 50 and 55 are inserted into the first and second toothbrush coupling grooves 33 and 43 so that end portions of the ball plungers 36b and 46b are coupled to the fixing grooves 36a and 46a, the first and second drive shafts 21 and 25 may be coupled with the first and second toothbrush bodies 50 and 55 by the first and second coupling units 36 and 46.

FIG. 8 shows first and second coupling units according to still another embodiment. Referring to the drawing, the first and second coupling units 37 and 47 include metal members 37a and 47a attached to magnets installed on lower portion of the first and second toothbrush bodies 50 and 55, and magnets 37b and 47b to which the metal members are attached and which are installed in the first and second toothbrush body coupling grooves 33 and 34 formed in the longitudinal direction of the first and second toothbrush bodies 50 and 55. In this case, as described in the embodiment, the first and second toothbrush body coupling grooves 33 and 34 have a cross-section in a tower shape or a polygonal shape to prevent the slippage of the first and second toothbrush bodies 50 and 55 coupled with the first and second drive shafts 21 and 25. The lower portions of the first and second toothbrush bodies 50 and 55 are made of a metal material, and the coupling member installed on end portions of the first and second drive shafts 21 and 25 may be made of a magnet.

The first and second coupling units are not limited to the above-described embodiments, the first and second drive shafts 21 and 25 and the first and second toothbrush bodies 50 and 55 may be coupled with each other when the rotating forces and the forward and backward motions of the first and second drive shafts 21 and 25 are transferred to the first and second toothbrush bodies 50 and 55. For example, a hook coupling groove may be formed in the first and second drive shafts 21 and 25, and unit hooks coupled to the hook coupling groove may be formed on end portions of the first and second toothbrush bodies. Polygonal-shaped insertion grooves are formed on end portions of the first and second toothbrush bodies, and the first and second rotating shafts coupled to the insertion grooves are formed in a polygonal shape, and thus the first and second rotating shafts may be forcibly inserted into the insertion grooves.

Meanwhile, as shown in FIGS. 9 and 10, the first and second brushes 61 and 65 include the first and second brush frames 63 and 67 supporting the bristles 62 and 66 twisted in a direction in which the bristles 62 and 66 are twisted in a rotation direction of the first and second toothbrush bodies 50 and 55. The first and second brush frames 63 and 67 are made of an elastic wire but are not limited thereto. When the first and second brush frames 63 and 67 are made of a wire, a twist direction for supporting the bristles 62 and 66 may be the same as rotation directions of the first toothbrush body 50 and the second toothbrush body 55. In this case, the twist direction of the wire of the brush 61 installed in the first toothbrush body 50 and the twist direction of the wire of the brush 66 installed in the second toothbrush body 55 are opposite to each other. As the loads of the wires of the first and second brushes 61 and 65 installed in the first and second toothbrush bodies applied to the first and second brushes 61 and 65 are increased by the rotation of the first and second toothbrush bodies, the supporting force of the bristles 62 and 66 increases. In this case, when a loosening prevention unit is installed so that end portions of the first and second brush frames 63 and 67 are not loosened, a twist direction is not necessarily limited.

The first and second journal parts 84 and 85 supported on the first and second shaft receiving parts 81 and 82 of the cover member 80 are installed on end portions of the first and second brushes 61 and 65, that is, end portions of the first and second brush frames 63 and 67. The first and second journal parts 84 and 85 allow the first and second brushes 61 and 65 to stably rotate and are supported in the first and second shaft receiving parts 81 and 82, and thus a contact force between the teeth and the brush can be increased when the teeth are cleaned.

First and second projections 84a and 85a are formed on outer circumferential surfaces of end portions of the first and second journal parts 84 and 85 formed on the first and second brush frames 63 and 67 so as not to come out of the first and second supporting parts 81 and 82 when the first and second journal parts 84 and 85 move forward and backward.

Meanwhile, the first and second brush frames 63 and 67 of the first and second brushes 61 and 65 may be coupled or separated by the end portions of the first and second toothbrush bodies 50 and 55 and the first and second brush coupling units, and the coupling may be achieved by forcible insertion or screw-coupling.

Meanwhile, a first brush coupling unit 91 coupling the first toothbrush body 50 and the first brush 61 and a second brush coupling unit 95 coupling the second toothbrush body 55 and the second brush 65 according to another embodiment are shown in FIG. 10.

Referring to the drawings, the first brush coupling unit 91 includes a first brush frame coupling groove 92 formed in the end portion of the first toothbrush body 50 to be coupled with the first brush frame 63, and a third spiral inclined groove 93 formed in an inner circumferential surface thereof. The first brush frame 63 of the first brush 61 includes a third spiral protrusion 94 coupled with the third spiral inclined groove 93 combined with the first brush frame coupling groove 92. The second brush coupling unit 95 includes a second brush frame coupling groove 96 for coupling with the second brush frame 67 formed in an end portion of the second toothbrush body 55, and a fourth spiral inclined groove 97 formed in an inner circumferential surface thereof. The second brush frame 67 of the second brush 65 includes a fourth spiral protrusion 98 coupled with the fourth spiral inclined groove 97 combined with the second brush frame coupling groove 96.

The couplings between the first and second toothbrush bodies 50 and 55 and the first and second brush frames 63 and 67 are not limited to the above-descriptions, and a structure of the first and second coupling units may be applied.

As shown in FIG. 11, the first and second brushes 61 and 65 may be coupled to end portions of first and second drive shafts 50 and 55 by the first and second brush coupling units, formed by extending the first and second drive shafts 21 and 25, without using the first and second toothbrush bodies. In this case, the first and second brush coupling units may use the same structure as the first and second coupling units.

To clean the teeth with the electric toothbrush 10 according to the present invention configured as described above, toothpaste is supplied to the first and second brushes 61 and 65 installed in the first and second toothbrush bodies 50 and 55, and the first and second brushes rotate and move forward and backward while the bristles 62 and 66, that is, the brush bristles of the first and second brushes 61 and 65 of the first and second toothbrush bodies 50 and 55, are pressed against an inner side and an outer side of the teeth (see FIG. 1) or the inner and outer sides thereof and an occlusal surface (see FIG. 2).

When the first and second brushes 61 and 65 are replaced due to their wear in the process of using the electric toothbrush 10, the first and second toothbrush bodies 50 and 55 having the first and second brushes installed on end portions thereof are separated from the first and second drive shafts 21 and 25 and are replaced. The first and second drive shafts and the first and second toothbrush bodies 50 and 55 are coupled by the first and second coupling units 30 and 40, and thus the first and second drive shafts 21 and 25 and the first and second toothbrush bodies 50 and 55 are easily coupled or separated as described above. Particularly, when the first and second coupling units 30 and 40 include the first and second spiral inclined grooves 31 and 41 formed in the first and second drive shafts 21 and 25 and the first and second spiral protrusions 32 and 42 formed on the first and second toothbrush bodies 50 and 55, the first and second spiral inclined grooves 31 and 41 and the first and second spiral protrusions 32 and 42 are coupled by rotation of the first and second drive shafts 21 and 25, and thus the first and second toothbrush bodies 50 and 55 in which the brushes 61 and 65 are installed may be easily coupled to or separated from the first and second drive shafts 21 and 25 without knowing how to couple and separate.

While the present invention has been particularly described with reference to exemplary embodiments shown in the drawings, the embodiments will be considered as only examples. It will be understood by those skilled in the art that various modifications and equivalent other embodiments may be made. Accordingly, the scope of the present invention should be defined by the technical scope of the appended claims.

The invention claimed is:

1. An electric toothbrush comprising:
a case configured at which a first drive shaft and a second drive shaft, which are rotated in opposite directions or rotated and moved forward or backward by a drive unit driven by a motor, are exposed;
a first toothbrush body and a second toothbrush body coupled with the first and second drive shafts by a first coupling unit and a second coupling unit to transfer forward and backward motions and rotating forces to the first and second toothbrush bodies; and
a first brush and a second brush installed on end portions of the first and second toothbrush bodies to clean teeth by the rotating forces and the forward and backward motions transferred to the first and second toothbrush bodies;
wherein:
the first coupling unit is configured to couple the first drive shaft installed in the case with the first toothbrush body, wherein the first drive shaft includes a first spiral inclined groove, and the first toothbrush body includes a first spiral protrusion coupled with the first spiral inclined groove by the rotating force of the first drive shaft;
the second coupling unit is configured to couple the second drive shaft installed in the case with the second toothbrush body, wherein the second drive shaft includes a second spiral inclined groove, and the second toothbrush body includes a second spiral protrusion coupled with the second spiral inclined groove by the rotating force of the second drive shaft; and
the first and second toothbrush bodies are coupled with the first and second drive shafts by the rotations of the first and second drive shafts, respectively.

2. The electric toothbrush of claim 1, wherein the first and second toothbrush bodies are coupled with the first and second brushes by a first and second brush coupling unit.

3. The electric toothbrush of claim 1, wherein the first and second toothbrush bodies coupled with the first and second drive shafts are installed to be inclined so that a gap between the first and second drive shafts gradually decreases from the first and second drive shafts toward the first and second brushes.

4. The electric toothbrush of claim 1, further comprising:
a cover main body part supported on an end portion of a cover support part extending from the case to surround one side of the first and second brushes; and
a first shaft receiving part and a second shaft receiving part installed on end portions of supporting parts extending from the cover main body part and supported so that end portions of a first and second brush frame of the first and second brushes are rotatable and movable forward and backward.

5. An electric toothbrush comprising:
a case configured at which a first drive shaft and a second drive shaft, which are rotated in opposite directions and moved forward and backward by a drive unit driven by a motor, are exposed;

a first toothbrush body and a second toothbrush body coupled with the first and second drive shafts by a first coupling unit and a second coupling unit to transfer forward and backward motions and rotating forces to the first and second toothbrush bodies;

a first brush and a second brush coupled with end portions of the first and second toothbrush bodies to clean teeth by the rotating forces and the forward and backward motions transferred to the first and second toothbrush bodies; and a third toothbrush body including an auxiliary brush coupled to a third drive shaft of the drive unit installed in the case to be rotated at a predetermined angle so as to brush an occlusal surface of the teeth;

wherein:

the first coupling unit is configured to couple the first drive shaft installed in the case with the first toothbrush body, wherein the first drive shaft includes a first spiral inclined groove, and the first toothbrush body includes a first spiral protrusion coupled with the first spiral inclined groove by the rotating force of the first drive shaft; and the second coupling unit is configured to couple the second drive shaft installed in the case with the second toothbrush body, wherein the second drive shaft includes a second spiral inclined groove, and the second toothbrush body includes a second spiral protrusion coupled with the second spiral inclined groove by the rotating force of the second drive shaft.

6. The electric toothbrush of claim 5, wherein the first and second toothbrush bodies coupled with the first and second drive shafts are installed to be inclined so that a gap between the first and second toothbrush bodies gradually decreases from the first and second drive shafts toward the first and second brushes.

7. The electric toothbrush of claim 5, wherein the first and second toothbrush bodies and the first and second brushes are coupled by a first and second brush coupling unit, respectively.

8. The electric toothbrush of claim 5, further comprising:

a cover main body part supported on an end portion of a cover support part extending from the case to surround one side of the first and second brushes;

a first shaft receiving part and a second shaft receiving part installed on end portions of first and second supporting parts extending from the cover main body part and supported so that end portions of a first and second brush frame of the first and second brushes are rotatable and movable forward and backward; and an auxiliary brush supporting part formed between the first and second supporting parts and configured to support an upper portion of the third toothbrush body.

* * * * *